US012552187B2

(12) United States Patent
Arakawa

(10) Patent No.: US 12,552,187 B2
(45) Date of Patent: Feb. 17, 2026

(54) LIQUID EJECTING DEVICE SWITCHABLE BETWEEN FIRST STATE IN WHICH TWO TERMINALS ARE SEPARATED FROM EACH OTHER AND SECOND STATE IN WHICH TWO TERMINALS ARE IN CONTACT WITH EACH OTHER

(71) Applicant: BROTHER KOGYO KABUSHIKI KAISHA, Nagoya (JP)

(72) Inventor: Yuta Arakawa, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 175 days.

(21) Appl. No.: 18/595,793

(22) Filed: Mar. 5, 2024

(65) Prior Publication Data

US 2024/0308253 A1 Sep. 19, 2024

(30) Foreign Application Priority Data

Mar. 13, 2023 (JP) ................................ 2023-038499

(51) Int. Cl.
*B41J 25/34* (2006.01)
*B41J 2/14* (2006.01)
*B41J 25/00* (2006.01)

(52) U.S. Cl.
CPC ............. *B41J 25/34* (2013.01); *B41J 25/001* (2013.01); *B41J 2/14201* (2013.01); *B41J 2002/14491* (2013.01); *B41J 2202/14* (2013.01); *B41J 2202/20* (2013.01)

(58) Field of Classification Search
CPC ...... B41J 25/34; B41J 25/001; B41J 2/14201; B41J 2002/14491; B41J 2202/14; B41J 2202/20
See application file for complete search history.

(56) References Cited

U.S. PATENT DOCUMENTS 6,024,439 A 2/2000 Seoka et al.
2022/0305790 A1* 9/2022 Arakawa ............. B41J 2/16511

FOREIGN PATENT DOCUMENTS

JP 9-141874 A 6/1997

* cited by examiner

*Primary Examiner* — Lisa Solomon
(74) *Attorney, Agent, or Firm* — Merchant & Gould P.C.

(57) ABSTRACT

A liquid ejecting device includes a head unit and a mounting unit. The head unit includes: a first channel member formed with a first channel having an ejection hole; and a first electronic member including a first terminal. The first channel member has an ejection surface in which the ejection hole is open. The mounting unit includes a second electronic member having a plate shape. The second electronic member includes a second terminal. The liquid ejecting device is switchable between: a first state in which the first and second terminals are separated from each other; and a second state in which the first and second terminals are in contact with each other. When the liquid ejecting device is in the second state, the second electronic member extends parallel to the ejection surface and a contact point between the first and second terminals is positioned upward relative to the first channel.

8 Claims, 11 Drawing Sheets

LIQUID EJECTING DEVICE SWITCHABLE BETWEEN FIRST STATE IN WHICH TWO TERMINALS ARE SEPARATED FROM EACH OTHER AND SECOND STATE IN WHICH TWO TERMINALS ARE IN CONTACT WITH EACH OTHER

REFERENCE TO RELATED APPLICATIONS

This application claims priority from Japanese Patent Application No. 2023-038499 filed on Mar. 13, 2023. The entire content of the priority application is incorporated herein by reference.

BACKGROUND ART

There has been known a conventional inkjet apparatus (liquid ejecting device) provided with a cartridge (a first channel member) in which channels are formed for conveying ink from ink tanks to ejection holes, an energy generating element unit (first electronic member) having connection electrodes (first terminals), and a driving element unit (second electronic member) having connection electrodes (second terminals). The driving element unit is a plate-shaped member that extends parallel to the surface of the cartridge (ejection surface) in which the ejection holes are formed.

SUMMARY

In the conventional inkjet apparatus, the second electronic member has a plate shape that extends parallel to the ejection surface of the cartridge. This configuration can facilitate downsizing in an orthogonal direction orthogonal to the ejection surface. However, when the cartridge is placed with the ejection holes facing downward, the channels in the cartridge are positioned above contact points between the connection electrodes (terminals). With this configuration, any liquid that leaks from the channels could become deposited on the terminals, causing the electronic members to become defective.

In view of the foregoing, it is an object of the present disclosure to provide a liquid ejecting device that can suppress defects in electronic members caused by leaked liquid while achieving downsizing in the orthogonal direction.

In order to attain the above and other objects, according to one aspect, the present disclosure provides a liquid ejecting device including a head unit and a mounting unit. The head unit includes a first channel member and a first electronic member. The first channel member is formed with a first channel having an ejection hole. The first channel member has an ejection surface in which the ejection hole is open. The first electronic member includes a first terminal. The mounting unit is configured to support the head unit such that the head unit is mountable on and removable from the mounting unit. The mounting unit includes a second electronic member having a plate shape. The second electronic member includes a second terminal. The liquid ejecting device is switchable between a first state and a second state. In the first state, the first terminal and the second terminal are separated from each other. In the second state, the first terminal and the second terminal are in contact with each other. When the liquid ejecting device is in the second state, the second electronic member extends parallel to the ejection surface and a contact point between the first terminal and the second terminal is positioned upward relative to the first channel.

In the above structure, the second electronic member has a plate shape that extends parallel to the ejection surface of the head unit when the liquid ejecting device is in the second state. Accordingly, the liquid ejecting device can be downsized in the vertical direction (the orthogonal direction orthogonal to the ejection surface. Moreover, in the above structure, the contact point between the first and second terminals is positioned upward relative to the first channel. Therefore, even when liquid leaks from the first channel, the leaking liquid is unlikely to become deposited on the first and second terminals. Accordingly, the first and second electronic members can be suppressed from becoming defective.

DESCRIPTION

First Embodiment

Figure 1:
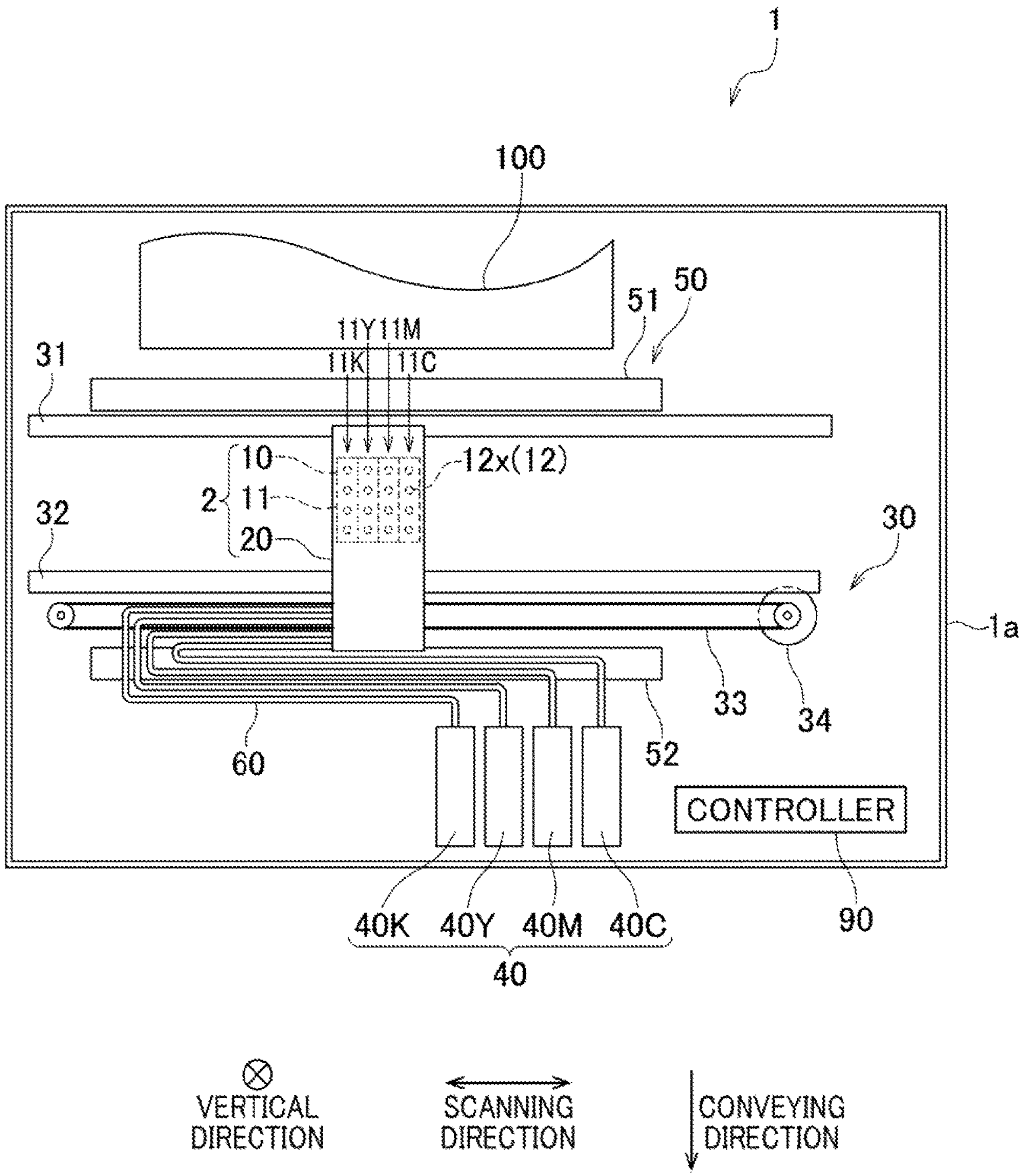
FIG. 1 is a is a schematic plan view of the internal structure of a printer 1.

FIG. 1 shows a printer 1 according to a first embodiment of the present disclosure. The printer 1 includes a housing 1*a*, an ejection unit 2, a scanning mechanism 30, a tank unit 40, a conveying mechanism 50, and a controller 90. The ejection unit 2, the scanning mechanism 30, the tank unit 40, the conveying mechanism 50, and the controller 90 are disposed inside the housing 1*a*. The ejection unit 2 includes a head unit 10 and a mounting unit 20.

The head unit 10 includes a channel member 11. The channel member 11 has four channels 12 formed therein. The four channels 12 correspond to ink in the respective colors cyan, magenta, yellow, and black. Each channel 12 has a plurality of ejection holes 12*x*; a plurality of individual channels 12*b* corresponding one-on-one with the plurality of ejection holes 12*x*; a common channel 12*a* in communication with the plurality of individual channels 12*b*; and a communication ports 12*y* in communication with the common channel 12*a*. The channel member 11 is an example of the "first channel member" of the present disclosure. The channels 12 are each an example of the "first channel" of the present disclosure.

The ejection holes 12*x* of the channels 12 constitute four columns 11C, 11M, 11Y, and 11K. The columns 11C, 11M, 11Y, and 11K are juxtaposed in a scanning direction. Each of the columns 11C, 11M, 11Y, and 11K is configured of the ejection holes 12*x* aligned in a conveying direction. The ejection holes 12*x* constituting the column 11C are holes for ejecting cyan ink; the ejection holes 12*x* constituting the column 11M are holes for ejecting magenta ink; the ejection holes 12*x* constituting the column 11Y are holes for ejecting yellow ink; and the ejection holes 12*x* constituting the column 11K are holes for ejecting black ink.

Figure 2:
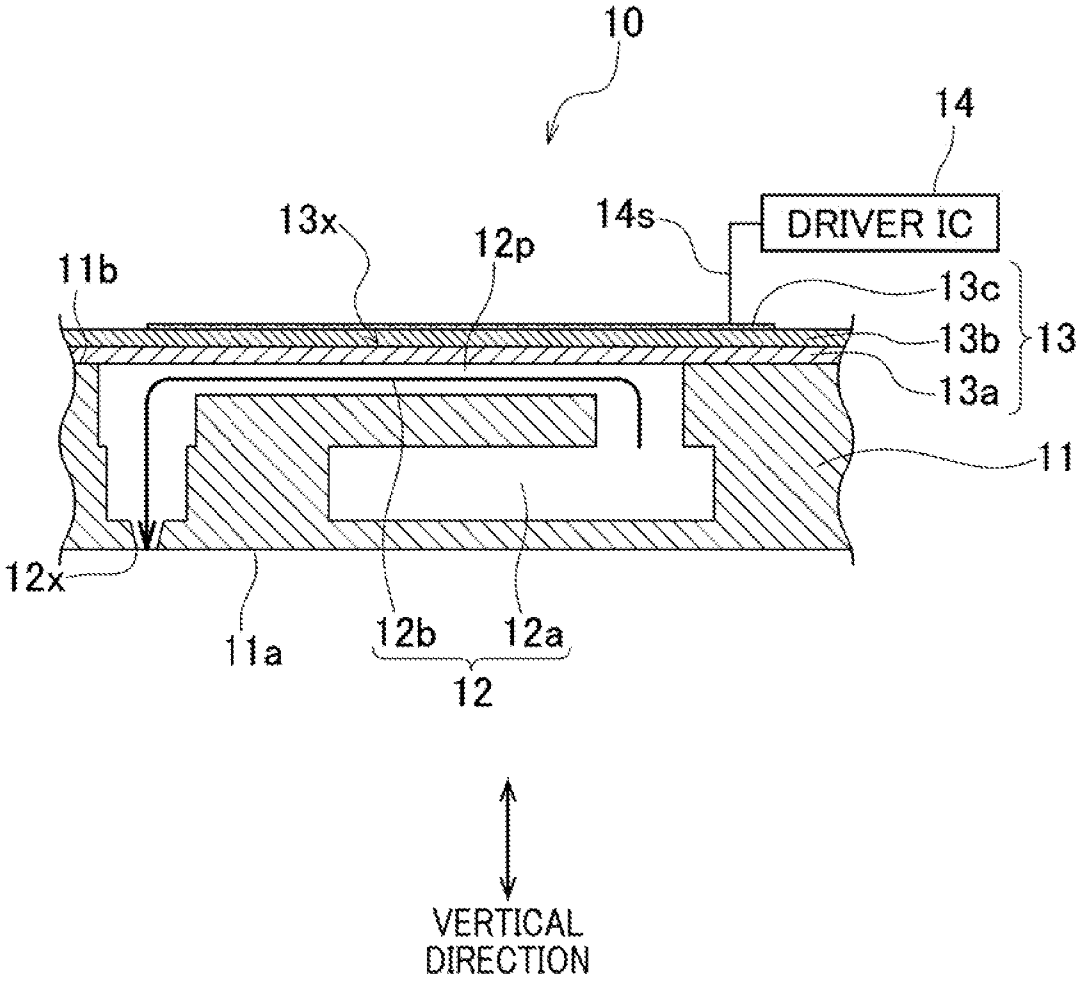
FIG. 2 is a cross-sectional view of a head unit 10 of the printer 1.

As shown in FIG. 2, the four common channels 12*a* (i.e., the four channels 12) corresponds to the respective columns 11C, 11M, 11Y, and 11K (see FIG. 1). As described above, the plurality of individual channels 12*b* of each channel 12 is in communication with the common channel 12*a* of the channel 12. Each individual channel 12*b* includes a pressure chamber 12*p* and extends from an outlet of the corresponding common channel 12*a* to the corresponding ejection hole 12*x* via the pressure chamber 12*p*.

Figure 5:
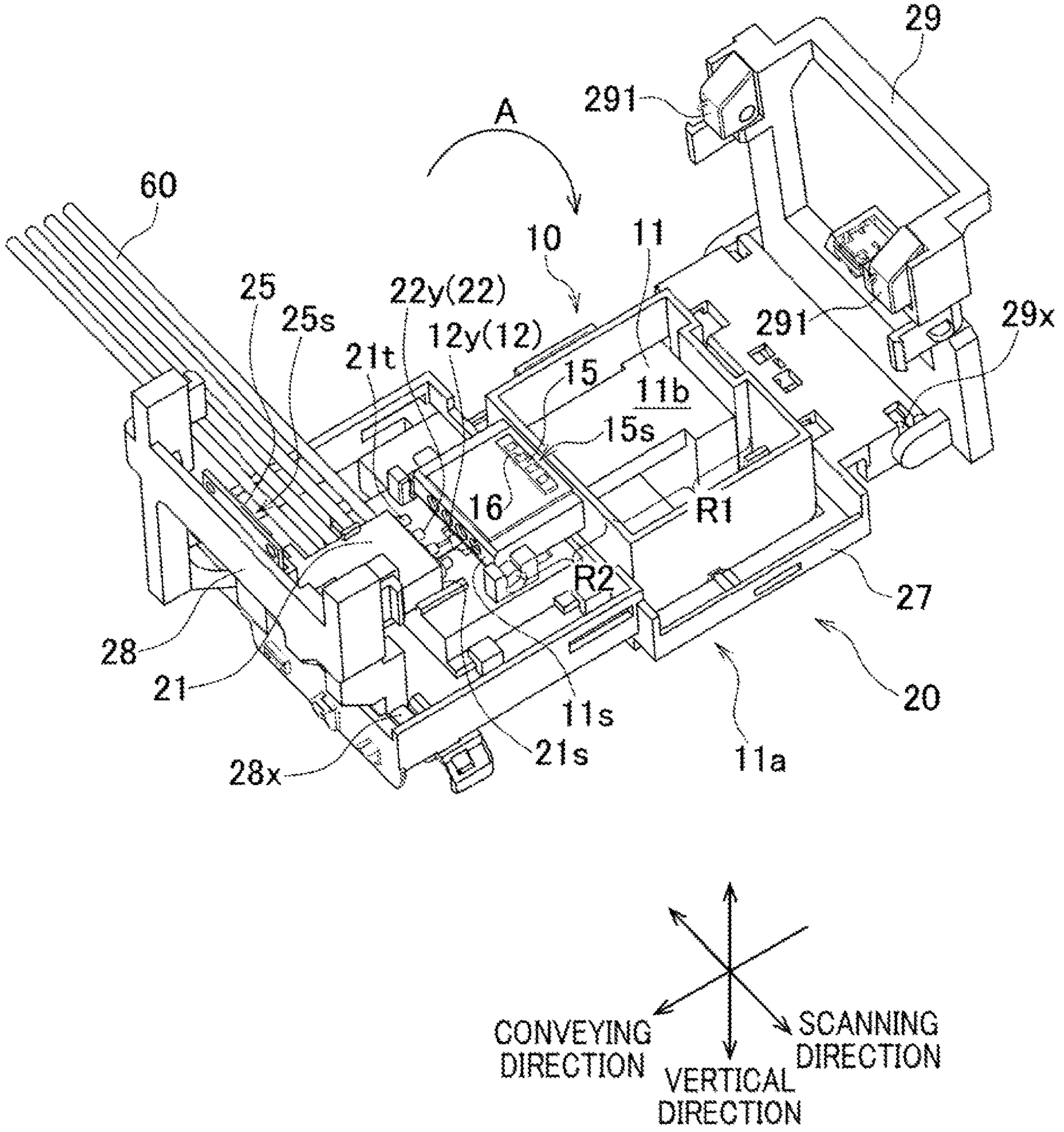
FIG. 5 is a perspective view illustrating a second step of the operation for mounting the head unit 10 on the mounting unit 20.
Figure 6:
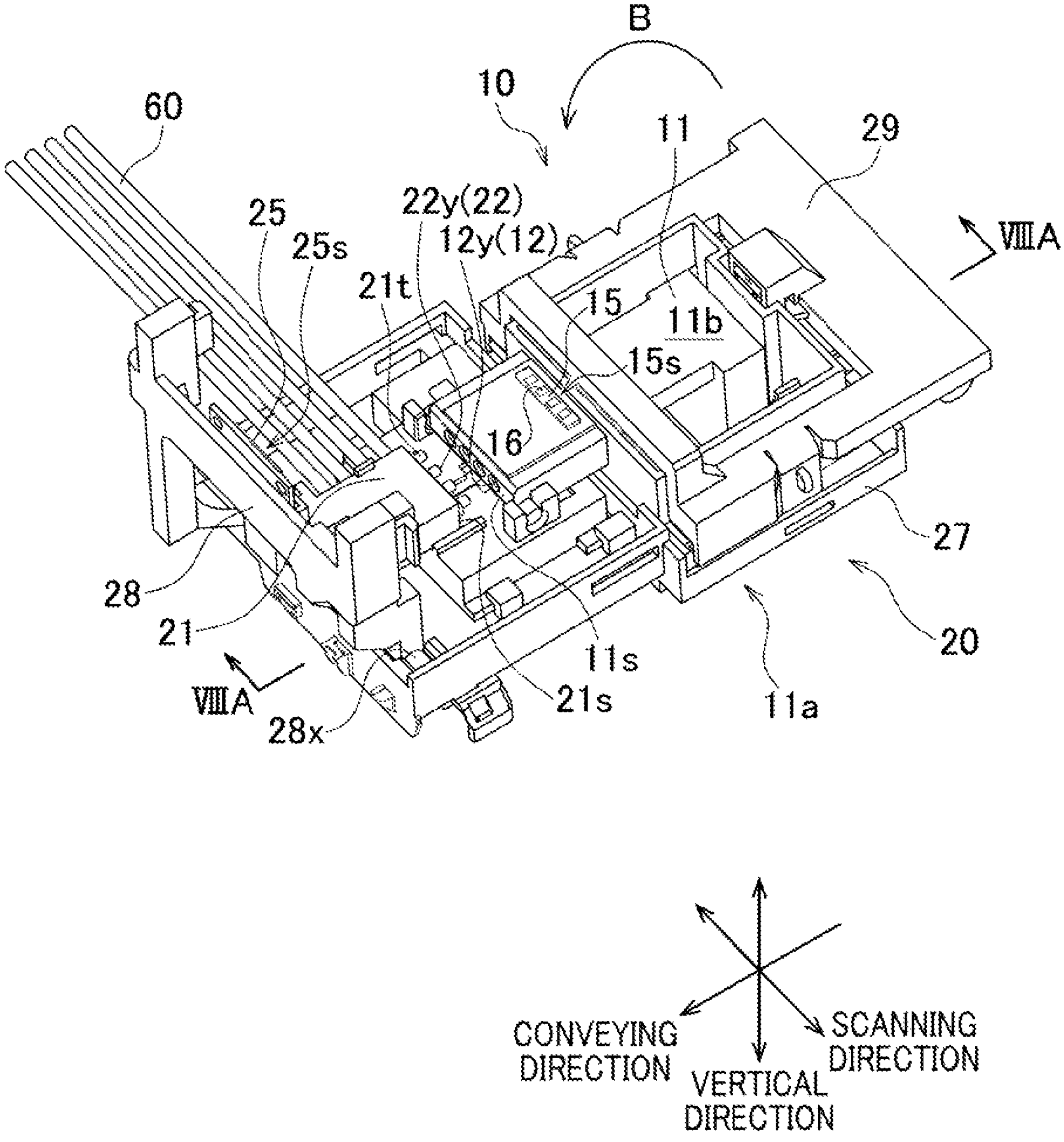
FIG. 6 is a perspective view illustrating a third step of the operation for mounting the head unit 10 on the mounting unit 20.

Each of the four common channels 12*a* has one end region that is in communication with the plurality of corresponding individual channels 12*b* belonging to the corresponding one of the columns 11C, 11M, 11Y, and 11K and another end that communicates with the corresponding communication port 12*y* (see FIGS. 5 and 6). The communication port 12*y* constitutes one end of the channel 12, and the ejection holes 12*x* constitute the other end of the channel 12. Thus, the communication port 12*y* is in communication with the corresponding ejection holes 12*x*. The communication ports 12*y* are each an example of the "first communication port" of the present disclosure.

The channel member 11 has a bottom surface 11*a*, and a top surface 11*b* opposite the bottom surface 11*a*. The ejection holes 12*x* are open in the bottom surface 11*a*, while the pressure chambers 12*p* are open in the top surface 11*b*. The bottom surface 11*a* is an example of the "ejection surface" of the present disclosure. The top surface 11*b* is an example of the "opposite surface" of the present disclosure.

As shown in FIG. 2, the head unit 10 also includes an actuator member 13, and a driver IC 14.

The actuator member 13 includes a metal diaphragm 13*a*; a piezoelectric layer 13*b*; and a plurality of individual electrodes 13*c* corresponding one-on-one with the plurality of pressure chambers 12*p*. The metal diaphragm 13*a* is arranged on the top surface 11*b* of the channel member 11 so as to cover the plurality of pressure chambers 12*p*. The piezoelectric layer 13*b* is arranged over the top surface of the diaphragm 13*a*. Each individual electrode 13*c* is arranged on the top surface of the piezoelectric layer 13*b* at a position opposing the corresponding pressure chamber 12*p*.

The diaphragm 13*a* and the plurality of individual electrodes 13*c* are electrically connected to the driver IC 14 via signal lines 14*s*. Under control of the controller 90, the driver IC 14 maintains the diaphragm 13*a* at ground potential while varying the potentials of the individual electrodes 13*c*. The potential of each individual electrode 13*c* is changed between a prescribed drive potential and the ground potential. The change in potential of each individual electrode 13*c* causes deformation in the portions of the diaphragm 13*a* and piezoelectric layer 13*b* sandwiched between the individual electrode 13*c* and corresponding pressure chamber 12*p*. The portions of the diaphragm 13*a* and piezoelectric layer 13*b* sandwiched between the individual electrode 13*c* and corresponding pressure chamber 12*p* function as an actuator 13*x*. This deformation changes the volume in the pressure chamber 12*p*, applying pressure to ink in the pressure chamber 12*p* and causing ink to be ejected from the corresponding ejection hole 12*x*. An actuator 13*x* is provided for each individual electrode 13*c* and can be independently deformed in accordance with the electric potential supplied to the corresponding individual electrode 13*c*.

The head unit 10 also includes an electronic member 15 (see FIGS. 4, 5, 6, and 8). The electronic member 15 is an example of the "first electronic member" of the present disclosure. The electronic member 15 is provided on one end of a flexible printed circuit board (FPC) with the signal lines 14*s*. The driver IC 14 is also mounted on the FPC. One end of the FPC is connected to the electronic member 15, and the other end of the FPC is connected to the actuator member 13.

The head unit 10 is mountable on and removable from the mounting unit 20. The mounting unit 20 is configured to support the head unit 10 such that the head unit 10 is mountable on and removable from the mounting unit 20. The mounting unit 20 includes a channel member 21 configured to be connected to the channel member 11, and an electronic member 25 configured to be electrically connected to the electronic member 15. The channel member 21 is formed with four channels 22 corresponding one-on-one with four tubes 60 described later (see FIG. 1). The channel member 21 is an example of the "second channel member" of the present disclosure. The channel 22 is an example of the "second channel" of the present disclosure. The electronic member 25 is an example of the "second electronic member" of the present disclosure.

The scanning mechanism 30 includes a pair of guides 31 and 32 for supporting the mounting unit 20, a belt 33 coupled to the mounting unit 20, and a scanning motor 34. The guides 31 and 32 and the belt 33 extend in the scanning direction. The belt 33 is positioned downward relative to the mounting unit 20. When the scanning motor 34 is driven under control of the controller 90, the belt 33 circulates, moving the mounting unit 20 along the guides 31 and 32 in the scanning direction.

The conveying mechanism 50 includes a pair of rollers 51 and a pair of rollers 52, and a conveying motor. When the conveying motor is driven under control of the controller 90, the pair of rollers 51 and the pair of rollers 52 rotate. When the pair of rollers 51 and the pair of rollers 52 rotate while a sheet 100 of paper is nipped between the pair of rollers 51 and/or between the pair of rollers 52, the sheet 100 is conveyed in the conveying direction.

The tank unit 40 includes four tanks 40C, 40M, 40Y, and 40K that store ink in the respective colors cyan, magenta, yellow, and black. Each of the four tanks 40C, 40M, 40Y, and 40K is configured to be connected to the channel 12 for the corresponding color in the channel member 11 via the corresponding tube 60 and the corresponding channel 22 of the channel member 21.

The scanning direction, the conveying direction, and the vertical direction are orthogonal to one another.

Next, the configurations of the head unit 10 and mounting unit 20 will be described in greater detail.

As shown in FIGS. 5 and 6, the channel member 11 of the head unit 10 has the bottom surface 11*a*, the top surface 11*b*, and four side surfaces connecting the bottom surface 11*a* to the top surface 11*b*. The four side surfaces include a side surface 11*s* that faces downstream in the conveying direction. The four communication ports 12*y* are open in the side surface 11*s*. The four communication ports 12*y* are aligned in the scanning direction. The side surface 11*s* is an example of the "second surface" of the present disclosure.

As shown in FIG. 5, in a plane parallel to the bottom surface 11*a*, the channel member 11 has an ejection area R1 where the ejection holes 12*x* (see FIGS. 1 and 2) are arranged, and a non-ejection area R2 where ejection holes 12*x* are not arranged. The non-ejection area R2 is adjacent to the ejection area R1 in the conveying direction and positioned downstream of the ejection area R1 in the conveying direction.

As shown in FIG. 5, the electronic member 15 of the head unit 10 is arranged in the non-ejection area R2 on the top surface 11*b* of the channel member 11. Note that in this ejection area R1 in the top surface 11*b* the pressure chambers 12*p* (see FIG. 2) are open and the actuator member 13 is arranged to cover the pressure chambers 12*p*, but the pressure chambers 12*p* and the actuator member 13 have been omitted from FIGS. 4 through 7.

As shown in FIG. 5, four terminals 16 are provided on a top surface 15*s* of the electronic member 15. The terminals 16 are aligned in the scanning direction. The four terminals 16 are each an example of the "first terminal" of the present disclosure.

Figure 3:
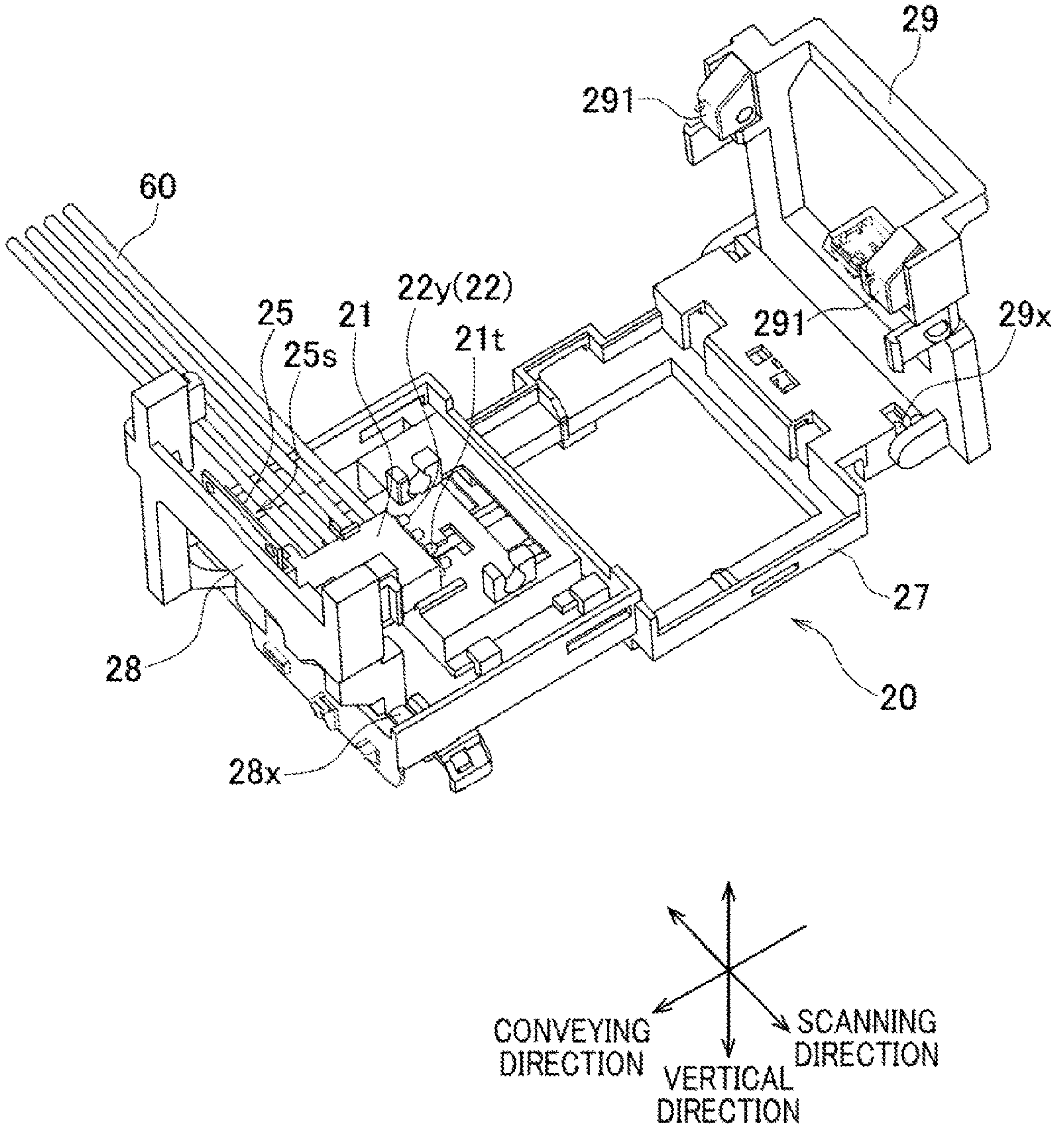
FIG. 3 is a perspective view of a mounting unit 20 of the printer 1.

As shown in FIG. 3, the mounting unit 20 includes a support member 27 and two pivot members 28 and 29. The two pivot members 28 and 29 are attached to the support member 27 so as to be pivotally movable. The pivot member 28 is an example of the "pivot member" of the present disclosure.

As shown in FIGS. 4 through 7, the support member 27 is configured to support the head unit 10. The support member 27 is a frame-like member for accommodating the ejection area R1 of the channel member 11 (see FIG. 5). The support member 27 is configured to support the head unit 10 so that the ejection holes 12*x* are exposed downward.

The pivot member 28 is attached to the downstream end of the support member 27 in the conveying direction so as to be pivotally movable about a pivot shaft 28*x* (and specifically, about the center axis of the pivot shaft 28*x*). The pivot member 29 is attached to the upstream end of the support member 27 in the conveying direction so as to be pivotally movable about a pivot shaft 29*x* (and specifically, about the center axis of the pivot shaft 29*x*). The pivot shafts 28*x* and 29*x* extend in the scanning direction.

As described above, the mounting unit 20 includes the channel member 21 having the channels 22 formed therein as shown in FIG. 3. The channel member 21 is an example of the "second channel member" of the present disclosure. The channels 22 are each an example of the "second channel" of the present disclosure.

The four channels 22 correspond one-on-one with the four tubes 60. In other words, one channel 22 is provided for each color of ink. One end of each channel 22 is in communication with the corresponding tube 60.

The channel member 21 has a side surface facing in the scanning direction and a side surface 21*s* facing upstream in the conveying direction. The four tubes 60 are attached to the side surface of the channel member 21 facing in the scanning direction. Four tubes 21*t* are provided in the side surface 21*s* of the channel member 21. The side surface 21*s* is an example of the "third surface" of the present disclosure. A communication port 22*y* is open in the distal end of each tube 21*t* on the side surface 21*s*. The communication ports 22*y* constitute the other ends of the channels 22 and are configured to be communicated with the corresponding communication ports 12*y* formed in the channel member 11 (see FIG. 5). The four tubes 21*t* are aligned in the scanning direction. The communication ports 22*y* are aligned in the scanning direction. The communication ports 22*y* are each an example of the "second communication port" of the present disclosure.

The electronic member 25 in the mounting unit 20 has a plate shape. The electronic member 25 has a surface 25*s* on which four terminals 26 (see FIG. 9B) are arranged. The surface 25*s* is an example of the "first surface" of the present disclosure. The terminals 26 are aligned in the scanning direction. The terminals 26 are slightly smaller than the terminals 16. The terminals 26 are each an example of the "second terminal" of the present disclosure.

The channel member 21 and the electronic member 25 are coupled to the pivot member 28 so as to move in conjunction with the pivotal movement of the pivot member 28. This associative movement will be described in greater detail in the following operations.

Next, the operations for mounting the head unit 10 in the mounting unit 20 will be described.

Figure 4:
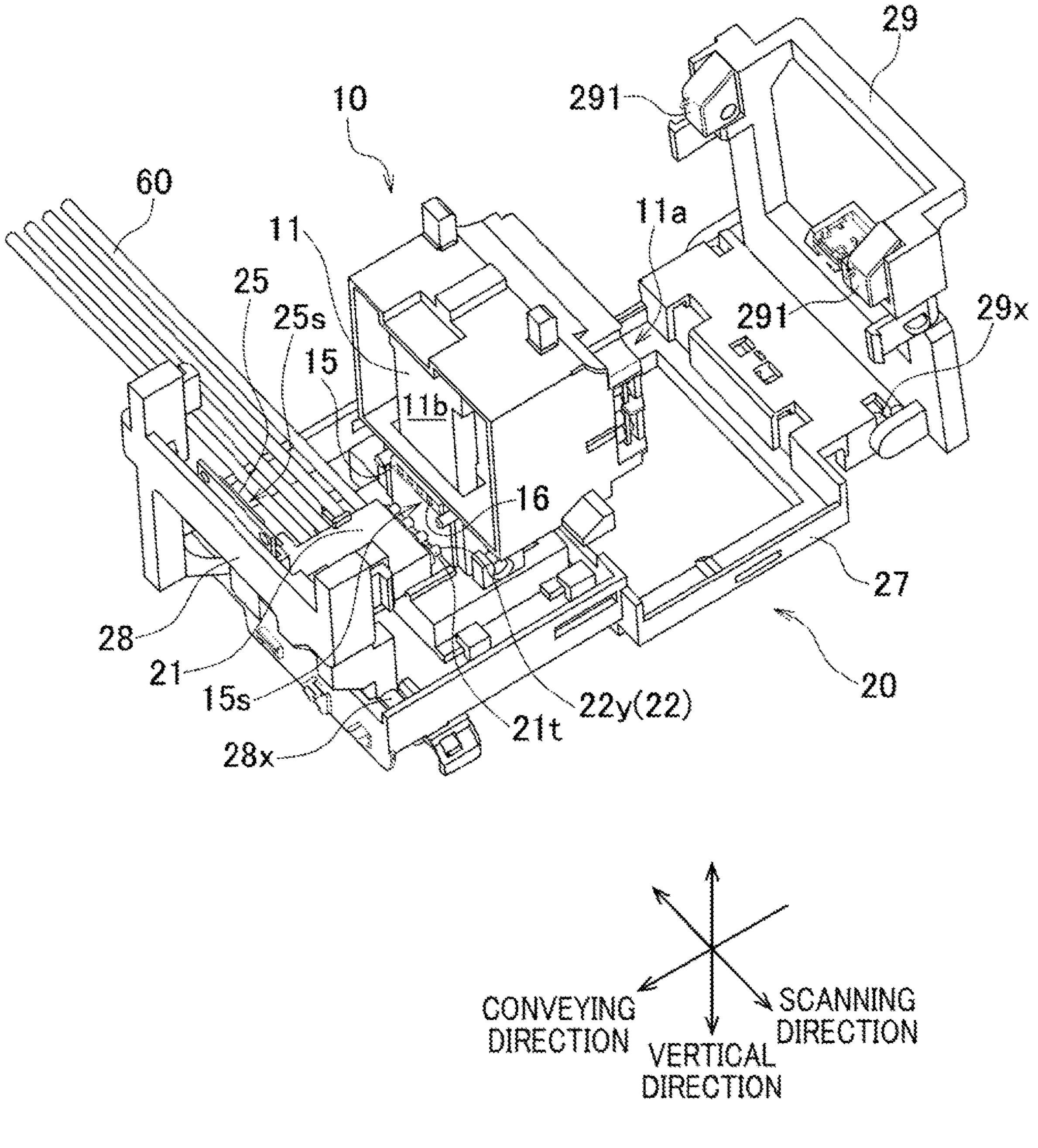
FIG. 4 is a perspective view illustrating a first step of an operation for mounting the head unit 10 on the mounting unit 20.

First, the user places the pivot members 28 and 29 of the mounting unit 20 in the open position shown in FIG. 4 and places the head unit 10 on a side of the support member 27 downstream in the conveying direction. At this time, the side surface 21*s* of the channel member 21 and the surface 25*s* of the electronic member 25 face upstream in the conveying direction. The head unit 10 is oriented so that the bottom surface 11*a* of the channel member 11 faces upstream in the conveying direction while the top surface 11*b* faces downstream in the conveying direction.

Next, the user pivotally moves the head unit 10 about the side of the support member 27 in the direction of the arrow A, as shown in FIG. 5. This action positions the channel member 11 so that the bottom surface 11*a* faces downward, the top surface 11*b* faces upward, and the side surface 11*s* faces downstream in the conveying direction. At this time, the side surface 11*s* opposes the side surface 21*s*. The ejection area R1 of the channel member 11 is arranged inside the frame of the support member 27, and the ejection holes 12*x* (see FIGS. 1 and 2) are exposed downward through the frame of the support member 27.

Next, the user moves the pivot member 29 from the open position shown in FIGS. 4 and 5 to the closed position shown in FIG. 6 by pivotally moving the pivot member 29 in the direction of arrow B. The pivot member 29 includes urging members 291 (see FIG. 5). Each urging member 291 is configured of a resin part and a spring attached thereto. When the pivot member 29 is in the closed position, the urging members 291 urge the head unit 10 downward and downstream in the conveying direction to fix the head unit 10 in position relative to the support member 27.

Figure 7:
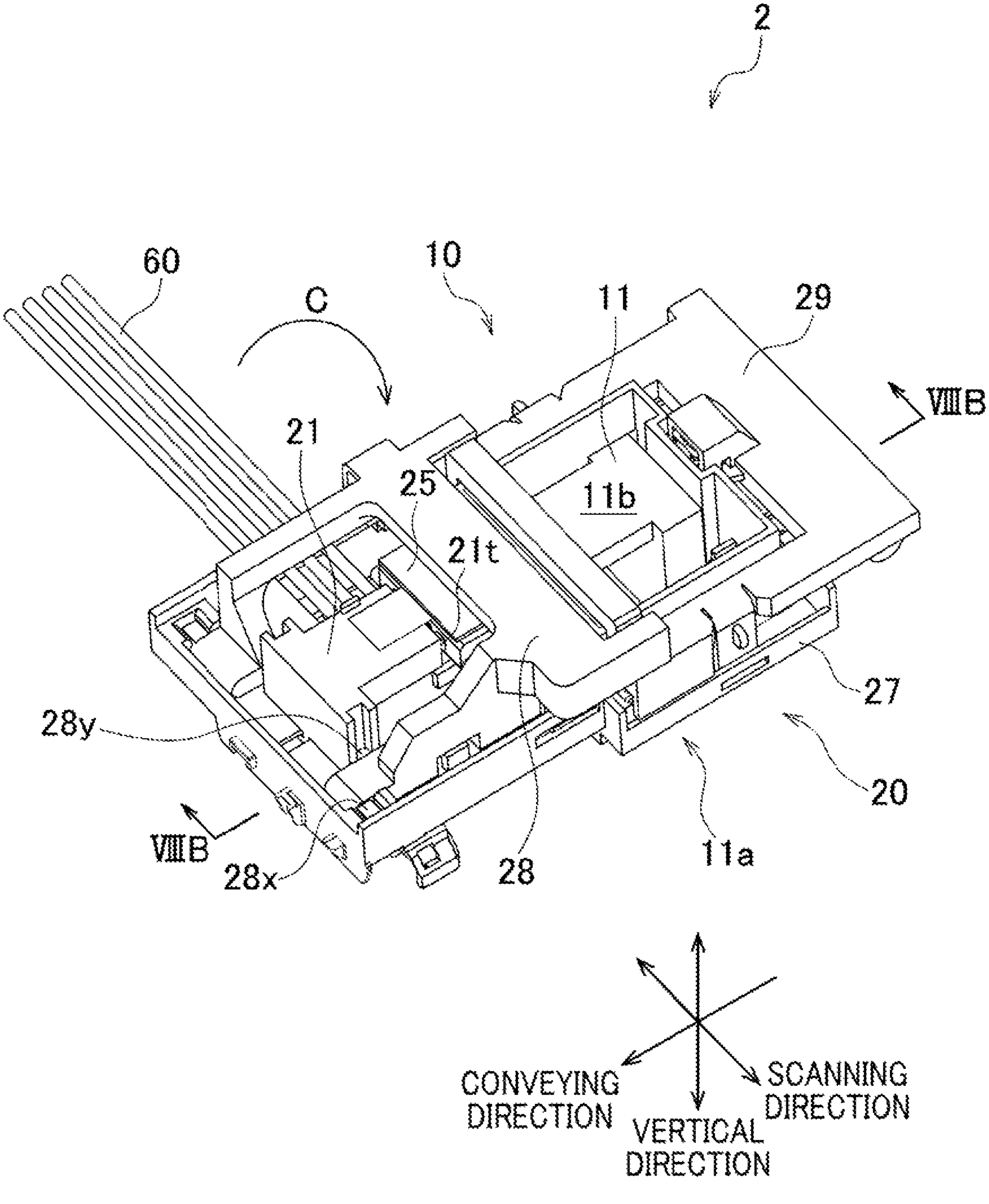
FIG. 7 is a perspective view illustrating a fourth step of the operation for mounting the head unit 10 on the mounting unit 20.

Next, the user moves the pivot member 28 from the open position shown in FIGS. 4 through 6 to the closed position shown in FIG. 7 by pivotally moving the pivot member 28 in the direction of arrow C. After both pivot members 28 and 29 have been placed in their closed positions, the operation for mounting the head unit 10 in the mounting unit 20 is complete and the ejection unit 2, which includes the head unit 10 and mounting unit 20, is fully assembled.

The channel member 21 moves upstream in the conveying direction as the pivot member 28 is moved from the open position to the closed position. At this time, the tubes 21*t* are inserted into the corresponding communication ports 12*y*. As a result, the communication ports 12*y* come into communication with the corresponding communication ports 22*y*, so that the channels 12 become connected to the corresponding channels 22. Here, the direction in which the channel member 21 moves relative to the channel member 11 in this operation is a direction that crosses the side surface 11*s* of the channel member 11.

Figure 8A:
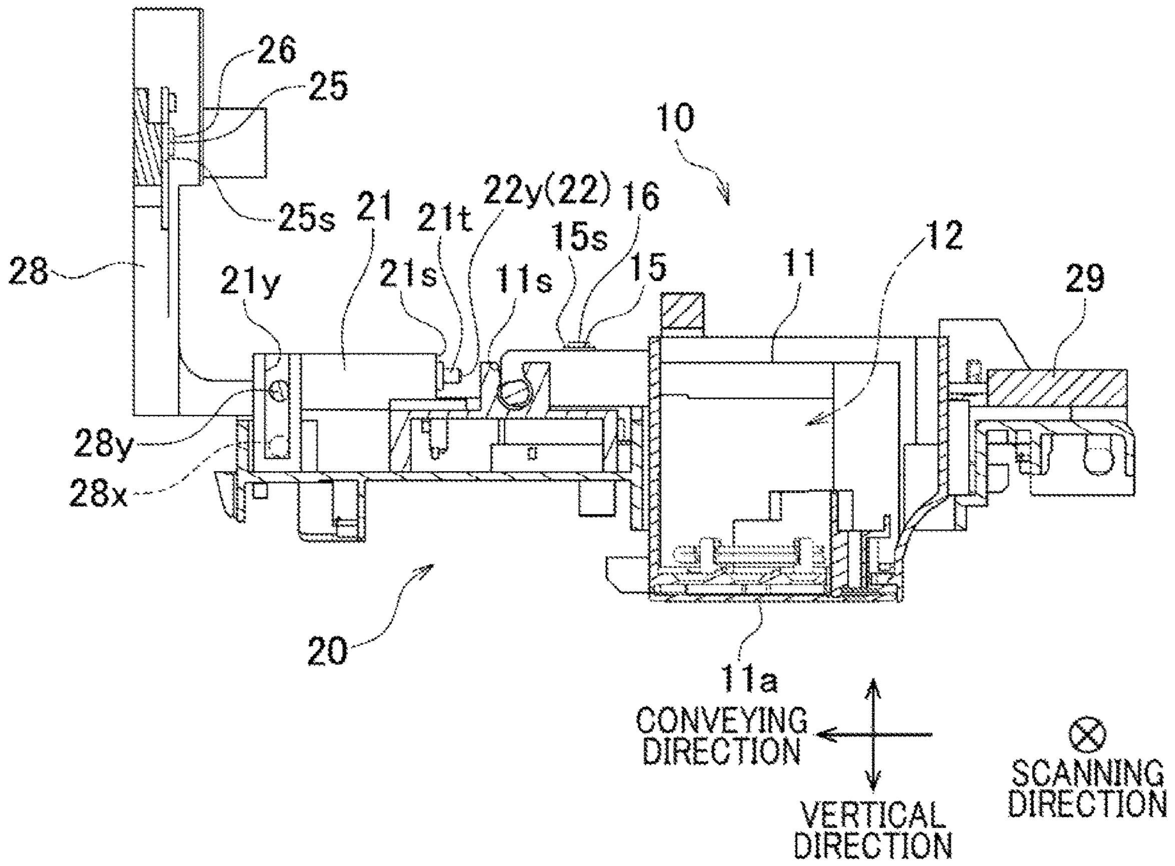
FIG. 8A is a cross-sectional view of the head unit 10 and the mounting unit 20 taken along line VIIIA-VIIIA of FIG. 6.
Figure 8B:
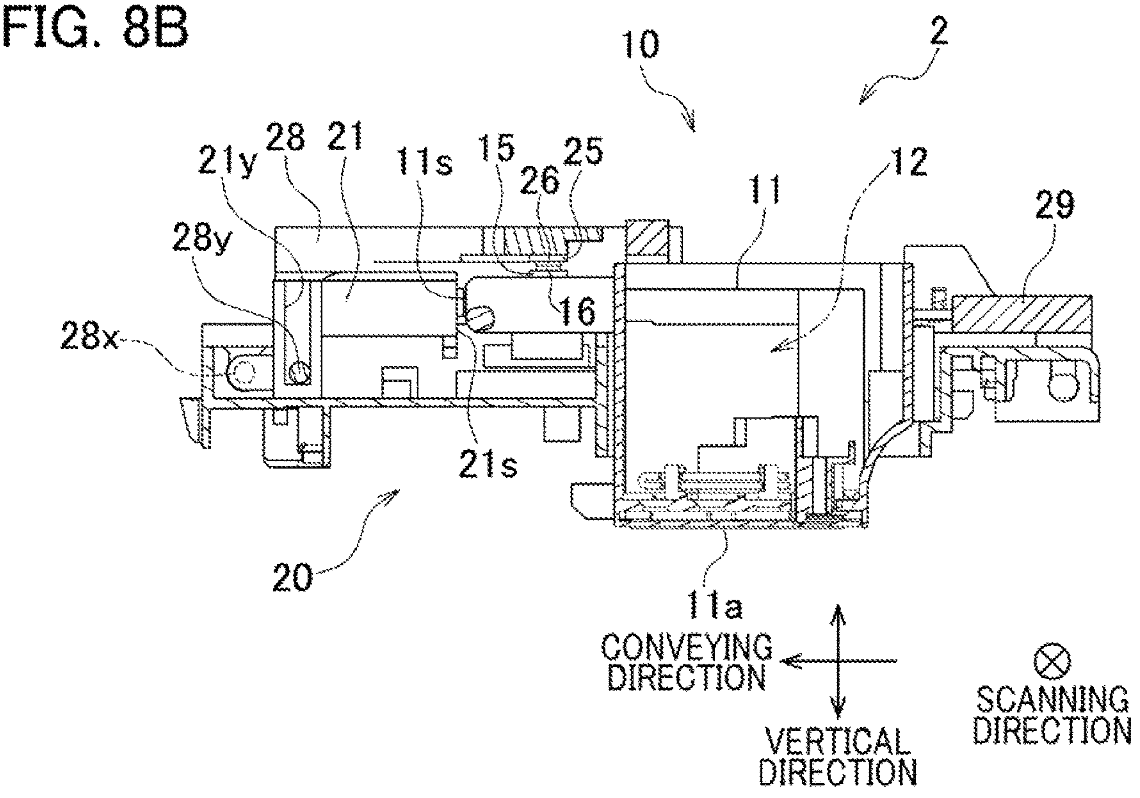
FIG. 8B is a cross-sectional view of the head unit 10 and the mounting unit 20 taken along line VIIIB-VIIIB of FIG. 7.

As shown in FIGS. 7 and 8, the channel member 21 has two grooves 21*y* formed in the downstream end portion of the channel member 21 in the conveying direction. One groove 21*y* is formed in each side of the channel member 21 in the scanning direction. The two grooves 21*y* extend vertically and are recessed inward in the scanning direction. The pivot member 28 also has two pins 28*y* provided near the pivot shaft 28*x*. One pin 28*y* is provided on each side of the pivot member 28 in the scanning direction and protrudes inward in the scanning direction. The pins 28*y* of the pivot member 28 are inserted into the corresponding grooves 21*y* formed in the channel member 21. When the pivot member 28 is moved from the open position shown in FIG. 8A to the closed position shown in FIG. 8B, the pins 28*y* move upstream in the conveying direction while remaining inserted in the grooves 21*y*. As a result, the pins 28*y* press against surfaces of the channel member 21 defining the corresponding grooves 21*y*, causing the channel member 21 to move upstream in the conveying direction.

Figure 9A:
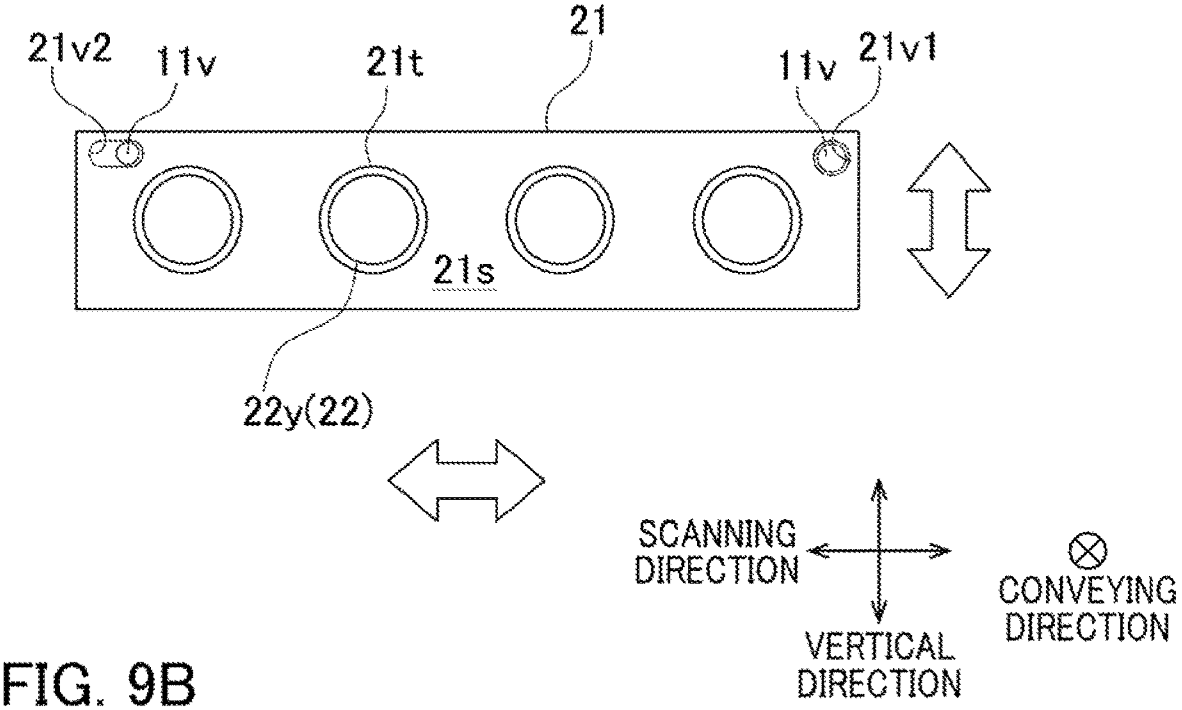
FIG. 9A is a schematic diagram illustrating a side surface 21*s* and communication ports 22*y* of a channel member 21 in the mounting unit 20.

As shown in FIG. 9A, the channel member 21 is connected to the pivot member 28 so as to be movable in directions parallel to the side surface 21*s* (i.e., movable both in the directions indicated by the white arrows depicted in FIG. 9A). The side surface 21*s* has two holes 21*v*1 and 21*v*2 formed at different positions from the communication ports 22*y*. The holes 21*v*1 and 21*v*2 are both arranged in corners of the side surface 21*s*. The hole 21*v*1 is positioned on one end of the side surface 21*s* in the scanning direction, while the hole 21*v*2 is positioned on the other end of the side surface 21*s* in the scanning direction. The hole 21*v*1 is a perfect circle hole, while the hole 21*v*2 is an elongated hole that is elongated in the scanning direction. The channel member 11 has two protrusions 11*v* on the side surface 11*s*, in which the communication ports 12*y* are open. Each protrusion 11*v* is cylindrical in shape and can be fitted into a corresponding one of the holes 21*v*1 and 21*v*2. The side surface 11*s* of the channel member 11 and the side surface 21*s* of the channel member 21 are fixed in position relative to each other by fitting the protrusions 11*v* into the respective holes 21*v*1 and 21*v*2. Fixing the surfaces 11*s* and 21*s* in position relative to each other by fitting the protrusions 11*v* into the holes 21*v*1 and 21*v*2 prior to connecting the channels 12 and 22 ensures that the channels 12 and 22 are connected precisely.

When the pivot member 28 is moved from the open position to the closed position, the electronic member 25 pivotally moves along with the pivot member 28 until reaching a position covering the top surface 11*b* of the channel member 11 from above. At this time, the surface 25*s* of the electronic member 25 opposes the top surface 11*b* of the channel member 11 and the terminals 26 of the electronic member 25 contact the corresponding terminals 16 of the electronic member 15.

Figure 9B:
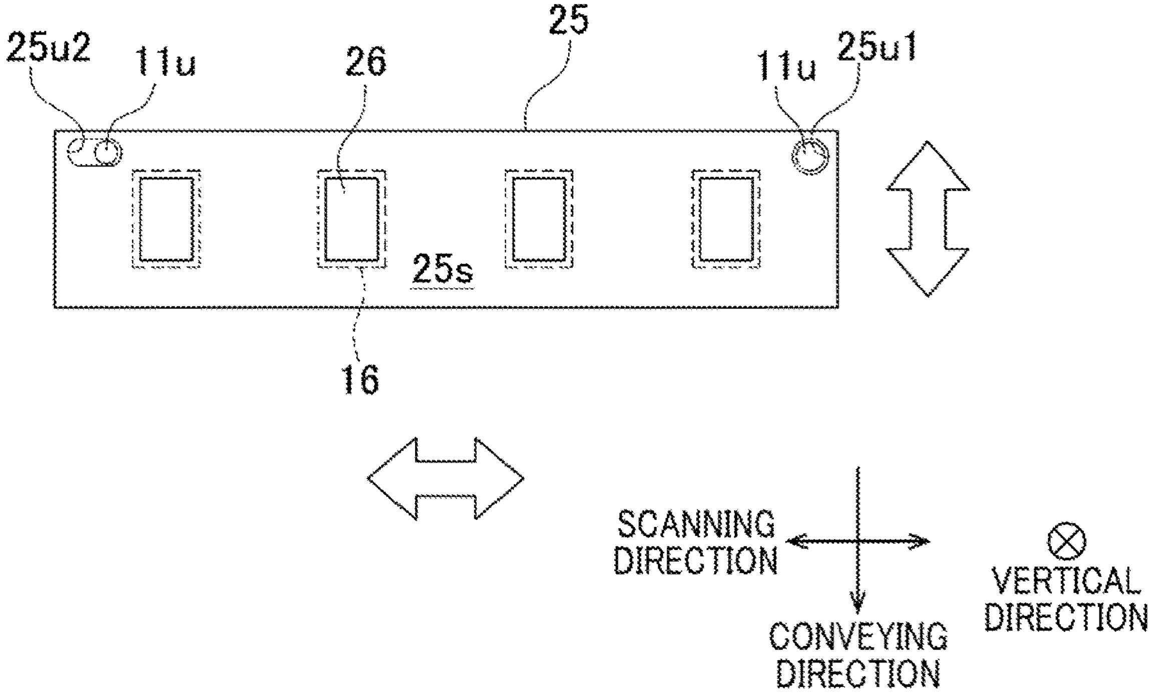
FIG. 9B is a schematic diagram illustrating a surface 25 and terminals 26 in the mounting unit 20.

As shown in FIG. 9B, the electronic member 25 is connected to the pivot member 28 so as to be movable in directions parallel to the surface 25*s* (i.e., movable both in the directions indicated by the white arrows depicted in FIG. 9B). The surface 25*s* has two holes 25*u*1 and 25*u*2 formed at different positions from the terminals 26. The holes 25*u*1 and 25*u*2 are both arranged in corners of the surface 25*s*. The hole 25*u*1 is positioned on one end of the surface 25*s* in the scanning direction, while the hole 25*u*2 is positioned on the other end of the surface 25*s* in the scanning direction. The hole 25*u*1 is a perfect circle hole, while the hole 25*u*2 is an elongated hole that is elongated in the scanning direction. The electronic member 15 has two protrusions 11*u* on the top surface 15*s*, on which the terminals 16 are arranged. Each protrusion 11*u* is cylindrical in shape and can be fitted into a corresponding one of the holes 25*u*1 and 25*u*2. The top surface 15*s* of the electronic member 15 and the surface 25*s* of the electronic member 25 are fixed in position relative to each other by fitting the protrusions 11*u* into the respective holes 25*u*1 and 25*u*2. Fixing the surfaces 15*s* and 25*s* in position relative to each other by fitting the protrusions 11*u* into the holes 25*u*1 and 25*u*2 prior to connecting the terminals 16 and 26 ensures that the terminals 16 and 26 are connected precisely.

Thus, the printer 1 can be switched between a first state (see FIGS. 4 through 6) in which the communication ports 12*y* and communication ports 22*y* are not in communication with each other and the terminals 16 and terminals 26 are separated from each other, and a second state (see FIG. 7) in which the communication ports 12*y* and communication ports 22*y* are in communication with each other and the terminals 16 and terminals 26 are in contact with each other. When the pivot member 28 is pivotally moved about the pivot shaft 28*x*, both the channel member 21 and electronic member 25 move toward the head unit 10 (see FIGS. 6 and 7). Moving both the channel member 21 and electronic member 25 relative to the head unit 10 in this way shifts the printer 1 from the first state to the second state.

In the second state, the electronic member 25 extends in a direction orthogonal to the vertical direction (i.e., parallel to the bottom surface 11*a* of the head unit 10), as illustrated in FIG. 9B. At this time, the contact points between the terminals 16 and terminals 26 are above the channels 12.

In a state where the printer 1 is in the second state, the controller 90 controls the conveying motor, scanning motor 34, and driver IC 14 to convey a sheet 100 and to eject ink onto the same, thereby recording an image on the sheet 100.

As described above, the electronic member 25 in the present embodiment has a plate shape that extends parallel to the bottom surface 11*a* of the head unit 10 when the printer 1 is in the second state (see FIG. 9B). Accordingly, the ejection unit 2, and thus the printer 1 that includes the ejection unit 2, can be downsized in the vertical direction (the orthogonal direction orthogonal to the bottom surface 11*a*). Moreover, the contact points between the terminals 16 and 26 are positioned upward relative to the channels 12. Therefore, even when ink leaks from the channels 12, the leaking ink is unlikely to become deposited on the terminals 16 and 26. Accordingly, the electronic members 15 and 25 can be suppressed from becoming defective.

The electronic member 25 is disposed on the pivot member 28. When the pivot member 28 is pivotally moved, the electronic member 25 is moved to a position covering the top surface 11*b* of the channel member 11 from above (see FIGS. 6 and 7). Hence, through the simple operation of pivotally moving the pivot member 28, the electronic member 25 can be positioned over the top surface 11*b* of the channel member 11.

The electronic member 25 is movable in directions parallel to the surface 25*s* (see FIG. 9B). With this configuration, the positions of the terminals 26 are adjusted in the directions parallel to the surface 25*s* when connecting the terminals 26 to the terminals 16, enabling the terminals 16 and 26 to be connected to each other easily and accurately.

The communication ports 12*y* are formed in the side surface 11*s* of the channel member 11, which is a surface different from the bottom surface 11*a* of the channel member 11 (see FIGS. 5 and 6). Accordingly, the channels 12 and 22 can be connected to each other at a surface on the channel member 11 different from the bottom surface 11*a*, which is the ejection surface. The printer 1 is shifted from the first state to the second state by moving the channel member 21 relative to the channel member 11 in a direction crossing the side surface 11*s* (see FIG. 8). In other words, the movement of the channel member 21 relative to the channel member 11 in a direction crossing the side surface 11*s* causes the printer 1 to be switched from the first state to the second state. With this configuration, the action of connecting the channels 12 and 22 to each other does not interfere with the positioning of the head unit 10 (and hence the ejection holes 12*x*), enabling both the connection of the channels 12 and 22 and the positioning of the head unit 10 to be performed reliably.

The channel member 21 is movable in directions parallel to the side surface 21*s* (see FIG. 9A). With this configuration, the positions of the channels 22 are adjusted in directions parallel to the side surface 21*s* when connecting the channels 22 to the channels 12, enabling the channels 12 and 22 to be connected easily and accurately.

The printer 1 includes the scanning mechanism 30 configured to move the mounting unit 20 in the scanning direction (see FIG. 1). In this configuration, if the vertical dimension of the ejection unit 2, which includes the head unit 10 and mounting unit 20, were large, the center of gravity of the ejection unit 2 would be high, and hence, the ejection unit 2 might tilt when moving in the scanning direction. In this case, the bottom surface 11*a* of the head unit 10 would not be parallel to the horizontal plane, so that ink ejection positions on the sheet 100 might deviate from the desired positions. However, since the ejection unit 2 in the present embodiment described above can be made smaller in the vertical direction, the center of gravity of the ejection unit 2 can be made lower. Accordingly, the ejection unit 2 is unlikely to tilt and cause deviations in the ejection positions when moving in the scanning direction.

The belt 33 of the scanning mechanism 30 is positioned downward relative to the mounting unit 20 (see FIG. 1). With this configuration, the ejection unit 2 may have a tendency to tilt, particularly when moved in the scanning direction by the circulating belt 33. However, since the ejection unit 2 of the embodiment described above can be made more compact in its vertical dimension, the ejection unit 2 is unlikely to tilt and cause deviations in the ejection positions when moving in the scanning direction, even when the belt 33 is positioned downward relative to the mounting unit 20.

Second Embodiment

Next, a printer 1A according to a second embodiment of the present disclosure will be described. In the following description, structures in the printer 1A of the second embodiment identical to those in the printer 1 of the first embodiment are designated with the same reference numerals to avoid duplicating description.

In the first embodiment (see FIGS. 6 and 7), the electronic member 15 is disposed on the top surface 11*b* of the channel member 11, and the electronic member 25 disposed on the pivot member 28 is placed in a position covering the top surface 11*b* of the channel member 11 from above in accordance with pivotal movement of the pivot member 28. In the printer 1A according to the second embodiment (see FIGS. 10 and 11), the electronic member 15 is disposed on the side surface 11*s* of the channel member 11, and the electronic member 25 is supported in the support member 27 and extends in a direction orthogonal to the vertical direction (i.e., parallel to the bottom surface 11*a* of the head unit 10).

Figure 10:
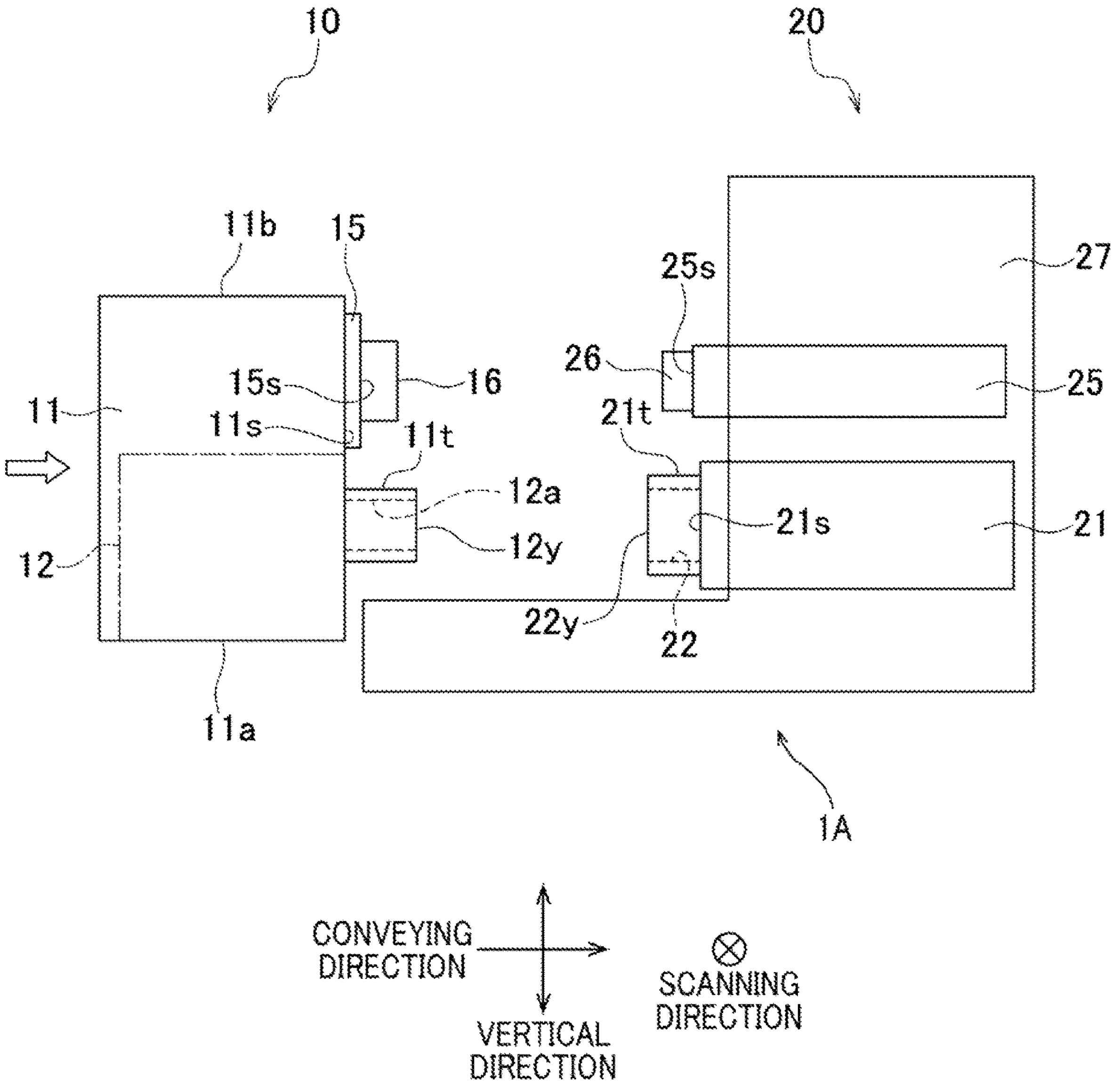
FIG. 10 is a side view illustrating an operation for mounting a head unit 10 on a mounting unit 20 in a printer 1A.
Figure 11:
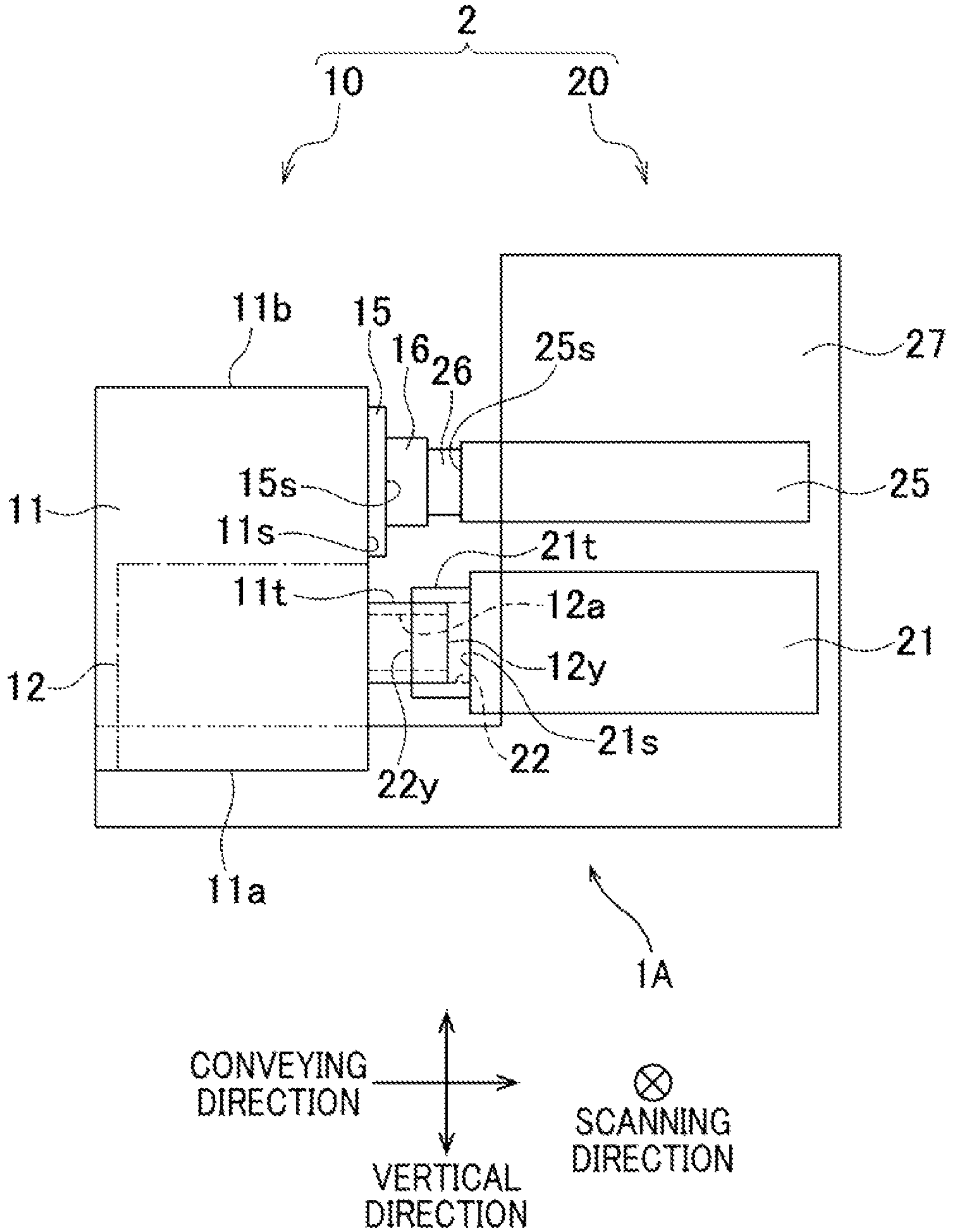
FIG. 11 is a side view illustrating a state in which the operation for mounting the head unit 10 on the mounting unit 20 is complete in the printer 1A

As illustrated in FIGS. 10 and 11, four tubes 11*t* are provided on the side surface 11*s* of the channel member 11. The communication ports 12*y* are open in the distal ends of the corresponding tubes 11*t*. The four tubes 11*t* are aligned in the scanning direction. The communication ports 12*y* are aligned in the scanning direction.

The electronic member 15 is arranged on the side surface 11*s* above the tubes 11*t*. The four terminals 16 are provided on the top surface 15*s* of the electronic member 15 and are aligned in the scanning direction.

The four tubes 21*t* are provided on the side surface 21*s* of the channel member 21. The communication ports 22*y* are open in the distal ends of the corresponding tubes 21*t*. The four tubes 21*t* are aligned in the scanning direction. The communication ports 22*y* are aligned in the scanning direction.

The electronic member 25 is arranged above the channel member 21. The four terminals 26 are provided on the surface 25*s* of the electronic member 25 and are aligned in the scanning direction.

The channel member 21 and electronic member 25 are supported in the support member 27 and extend in a direction orthogonal to the vertical direction. The side surface 21*s* and the surface 25*s* face upstream in the conveying direction.

The operations for mounting the head unit 10 in the mounting unit 20 according to the second embodiment include the operation of moving the head unit 10 downstream in the conveying direction. By moving the head unit 10 downstream in the conveying direction from the state shown in FIG. 10, the communication ports 12*y* and communication ports 22*y* are brought into communication with each other and the terminals 16 and terminals 26 are brought into contact with each other, as illustrated in FIG. 11. This completes the operation of mounting the head unit 10 in the mounting unit 20 and completes assembly of the ejection unit 2, which includes the head unit 10 and mounting unit 20.

Thus, the printer 1A according to the second embodiment is switchable between a first state (see FIG. 10) in which the communication ports 12*y* and communication ports 22*y* are not in communication with each other and the terminals 16 and terminals 26 are separated from each other, and a second state (see FIG. 11) in which the communication ports 12*y* and communication ports 22*y* are in communication with each other and the terminals 16 and terminals 26 are in contact with each other. Moving the channel member 21 and electronic member 25 relative to the channel member 11 and electronic member 15 in a direction crossing the side surface 11*s* of the channel member 11 shifts the printer 1A from the first state to the second state.

In the second state, the electronic member 25 extends in a direction orthogonal to the vertical direction (i.e., parallel to the bottom surface 11*a* of the head unit 10), as illustrated in FIG. 11. Specifically, in the present embodiment, the electronic member 25 extends in the scanning direction. The contact points between the terminals 16 and terminals 26 are located above the channels 12.

As in the first embodiment described above, when the printer 1A is in the second state in the second embodiment (see FIG. 11), the plate-shaped electronic member 25 extends parallel to the bottom surface 11*a* of the head unit 10. Accordingly, the ejection unit 2, and thus the printer 1A that includes the ejection unit 2, can be downsized in the vertical dimension (the orthogonal direction orthogonal to the bottom surface 11*a*). Moreover, the contact points between the terminals 16 and 26 are located above the channels 12. Even when ink leaks from the channels 12, the leaking ink is unlikely to become deposited on the terminals 16 and 26, suppressing the electronic members 15 and 25 from becoming defective.

In the second embodiment, the electronic member 15 is disposed on the side surface 11*s* of the channel member 11, and the printer 1A is shifted from the first state to the second state by moving the electronic member 25 relative to the electronic member 15 in a direction crossing the side surface 11*s* of the channel member 11. In other words, the movement of the electronic member 25 relative to the electronic member 15 in a direction crossing the side surface 11*s* causes the printer 1A to be switched from the first state and the second state. With this configuration, operations related to connecting the terminals 16 and 26 to each other are performed at the side surface 11*s* and operations related to positioning the head unit 10 (and hence the ejection holes 12*x*) are performed at the bottom surface 11*a*. Therefore, the two operations do not interfere with each other. Accordingly, connecting the terminals 16 and 26 together and positioning the head unit 10 can both be performed reliably.

VARIATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The timing of connecting the terminals, the timing of connecting the channels, and the timing of positioning the head unit need not be simultaneous but may be staggered.

In the embodiments described above, the first and second communication ports are openings through which liquid is supplied into the first channels from tanks. However, the first and second communication ports are not limited to those configurations but may be openings through which liquid is returned from the first channels to the tanks, for example.

The head unit is not limited to a serial head but may be a line head. In the case of a line-type head unit, the mounting unit may be fixed to the housing of the liquid ejecting device and need not move together with the head unit relative to the housing.

The medium on which liquid is ejected is not limited to paper, but may be fabric, substrates, or plastic materials, for example.

The liquid ejected from the ejection holes is not limited to ink but may be any liquid, such as a treatment liquid for coagulating or precipitating a component of ink.

The present disclosure is not limited to a printer, but may be applied to a facsimile machine, a copy machine, a multifunction peripheral, or the like. Alternatively, the present disclosure may be applied to a liquid ejecting device used in applications other than recording images, such as a liquid ejecting device for forming conductive patterns by ejecting a conductive liquid onto a substrate.

What is claimed is:

1. A liquid ejecting device comprising:
a head unit comprising:
a first channel member formed with a first channel having an ejection hole, the first channel member having an ejection surface in which the ejection hole is open; and
a first electronic member comprising a first terminal; and
a mounting unit configured to support the head unit such that the head unit is mountable on and removable from the mounting unit, the mounting unit comprising a second electronic member having a plate shape, the second electronic member comprising a second terminal,
wherein the liquid ejecting device is switchable between:
a first state in which the first terminal and the second terminal are separated from each other; and
a second state in which the first terminal and the second terminal are in contact with each other, and
wherein, when the liquid ejecting device is in the second state, the second electronic member extends parallel to the ejection surface and a contact point between the first terminal and the second terminal is positioned upward relative to the first channel.

2. The liquid ejecting device according to claim 1,
wherein the first channel member further has an opposite surface opposite the ejection surface,
wherein the first electronic member is disposed on the opposite surface,
wherein the mounting unit further comprises:
a support member configured to support the head unit; and
a pivot member attached to the support member so as to be pivotally movable,
wherein the second electronic member is disposed on the pivot member, and
wherein a pivotal movement of the pivot member causes the second electronic member to be placed in a position covering the opposite surface from above.

3. The liquid ejecting device according to claim 1,
wherein the second electronic member has a first surface on which the second terminal is disposed, and
wherein the second electronic member is movable in a direction parallel to the first surface.

4. The liquid ejecting device according to claim 1,
wherein the first channel member further has:
an opposite surface opposite the ejection surface; and
a second surface connecting the ejection surface and the opposite surface to each other, wherein the first channel has a first communication port in communication with the ejection hole, the first communication port being open in the second surface, wherein the mounting unit further comprises a second channel member formed with a second channel having a second communication port, wherein, when the liquid ejecting device is in the first state, the first communication port and the second communication port are not in communication with each other, wherein, when the liquid ejecting device is in the second state, the first communication port and the second communication port are in communication with each other, and wherein a movement of the second channel member relative to the first channel member in a direction crossing the second surface causes the liquid ejecting device to be switched from the first state to the second state.

5. The liquid ejecting device according to claim 4, wherein the second channel member has a third surface in which the second communication port is open, and wherein the second channel member is movable in a direction parallel to the third surface.

6. The liquid ejecting device according to claim 1, wherein the first channel member further has:

an opposite surface opposite the ejection surface; and a second surface connecting the ejection surface and the opposite surface to each other, wherein the first electronic member is disposed on the second surface, and wherein a movement of the second electronic member relative to the first electronic member in a direction crossing the second surface causes the liquid ejecting device to be switched from the first state to the second state.

7. The liquid ejecting device according to claim 1, further comprising:

a scanning mechanism configured to move the mounting unit in a direction parallel to the ejection surface.

8. The liquid ejecting device according to claim 7, wherein the scanning mechanism comprises a belt coupled to the mounting unit, the belt being positioned downward relative to the mounting unit.

* * * * *